United States Patent Office 2,721,776
Patented Oct. 25, 1955

2,721,776
ROLLER SET FOR ROLLER BEARINGS

John Ture Ruist, Goteborg, Sweden, assignor, by mesne assignments, to SKF Industries, Inc., Philadelphia, Pa., a corporation of Delaware Application April 4, 1952, Serial No. 280,505

4 Claims. (Cl. 308—217)

It has been suggested to arrange the rollers of a cylindrical roller bearing in such a manner that the axes of the rollers are alternately inclined to different sides so that they cross each other at an angle of 90°. It has also been suggested to provide each roller of a cylindrical roller bearing with a separate cage element. The cage elements are pivotally joined together to form a unit. In the latter case, however, the axes of the rollers were not arranged crosswise and it was therefore necessary to make the cage elements differently depending on the purpose to which the bearing must be put, so that for example, in certain cases the axes of the joints were parallel with the axes of the rollers and in other cases perpendicular thereto. The present invention has for its purpose to provide a set of rollers for a roller bearing, so constituted that it can be used without alteration in bearings of different sizes and forms and also be mounted in different ways, for example for rotating or oscillating movement or for straight bearings for reciprocating slide movements and for different types of load, for instance radial load, axial load or combined loads.

The roller set according to the invention is provided with a roller cage comprising a number of plane articulated cage elements of sheet metal and is characterized thereby that the cage elements are arranged to retain the rollers in position with their axes inclined at an angle of substantially 45° relative to the plane of the cage elements and so disposed and connected to each other that a portion of the axes of the rollers, for instance those of every other roller cross the axes of the other rollers.

Figure 1:
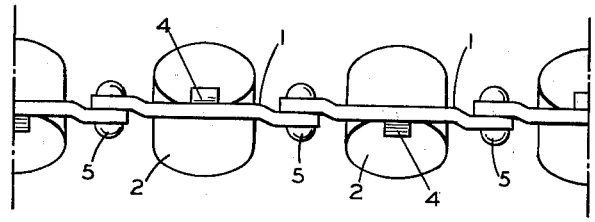
Figure 2:
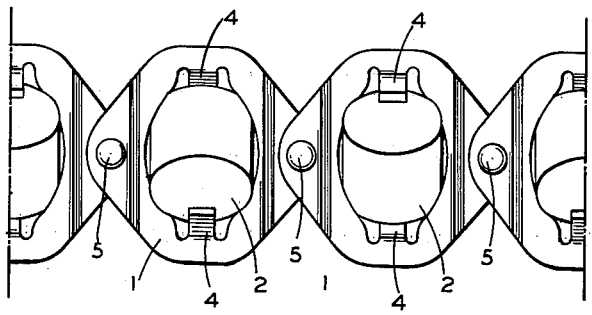
Figure 3:
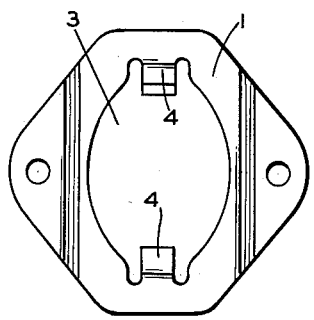
Figure 4:
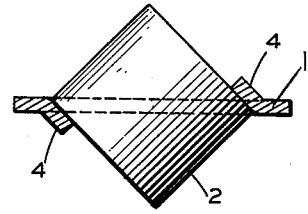
Figure 5:
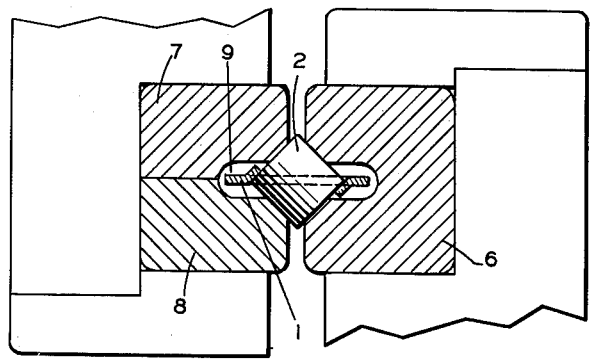

One form of the set of rollers according to the invention and an example of the use of such a set is illustrated by the accompanying drawing in which Fig. 1 shows a side view of a part of the roller set and Fig. 2 a plan view thereof. Fig. 3 is a plan view of a cage element without roller. Fig. 4 is a section through one of the cage elements with roller contained therein. Fig. 5 shows a section through a bearing with a roller set according to the invention.

In the roller set shown in Figs. 1 and 2, the numeral 1 designates the cage elements in which are mounted rollers 2. The cage elements are provided with more or less elliptical roller pockets 3, in which the rollers are mounted so that their axes are inclined at an angle of 45° to the plane of the cage element, as is shown most clearly in Fig. 4. The cage elements are provided with fingers 4 at each end of the pockets bent in opposite directions at an angle of 45° to the plane of the cage elements. The fingers engage the ends of the rollers and retain the rollers in place in the roller pockets. In order that the roller may be inserted in the pocket, it is therefore necessary that at least one of the fingers be first bent aside somewhat. The roller is then inserted, after which the position of the finger is adjusted to retain the roller in the pocket.

The cage elements with the rollers contained therein can now be assembled to form a unit with the aid of rivets 5. Every other element, or a suitable number of elements, is turned so that the axes of the rollers are at an angle of 90° to the axes of the remaining rollers. The rivets form joints which make possible relative movement between the cage elements. A suitable number of cage elements with rollers can therefore be assembled to a roller set suitable for the bearing dimension in question. The ends of the cage elements are somewhat offset in opposite directions, so that all cage elements will be located in the same plane.

Fig. 5 shows a part of a bearing with a roller set according to the invention. In bearings for rotating movement the roller set comprising a number of cage elements 1 and rollers 2 are assembled between a pair of concentric bearing rings. The inner ring 6 is in one piece, while the outer ring is divided into two pieces 7 and 8 to enable the roller set to be inserted between the rings. The ring 6 and the ring parts 7 and 8 are provided with slots 9, which provide space for the cage. A bearing of this type can carry both axial and radial loads without it being necessary to change the shape of the cage elements to suit the purpose for which the bearing is to be used.

Fig. 5 can also be assumed to represent a bearing for rectilinear movement, such as takes place in machine tool slides and the like. In this case, the members 6, 7 and 8 would be straight instead of being rings and the members 7 and 8 may be made in one piece.

Other forms of the invention may of course be used falling within the scope of the invention.

I claim:

1. A roller set for roller bearings having an articulated roller cage comprising a number of pivotally connected substantially plane cage elements of sheet metal, each said element having an opening forming a roller pocket together with a finger at each end of said pocket, said fingers being angularly displaced from the plane of the element and from the opposite faces respectively of said element, a roller mounted in said pocket with its axis inclined at an angle of approximately 45° to the plane of the element and with its end surfaces in confronting relation respectively with said fingers, the opposite side edges of the pocket converging toward each of the said ends of the pocket so as to afford limited roller-guiding contact between the said edges and the curved surface of the roller toward each end of the latter, and the said fingers and converging edges confining the roller in the pocket and maintaining the roller in the said inclined position, the axis of certain of the rollers being oppositely inclined to and crossing the axis of others of the rollers, and the rollers of one inclination being interspersed longitudinally of the set with the rollers of opposite inclination.

2. A roller set according to claim 1 wherein the axis of the pivotal connection between the adjoining pairs of cage elements is normal to the planes of said elements.

3. A roller set according to claim 2 wherein the pivotally connected ends of the cage elements are offset from the planes of the said elements so that the socketed portions of the elements occupy a common plane.

4. A roller set according to claim 3 wherein the offset ends of each of the cage elements occupy positions at opposite sides respectively of the plane of the element.

References Cited in the file of this patent

UNITED STATES PATENTS

| 543,720 | Berger | July 30, 1895 |
| 1,160,309 | Merz | Nov. 16, 1915 |
| 2,242,498 | Zwick | May 20, 1941 |
| 2,349,824 | Irasek | May 30, 1944 |

FOREIGN PATENTS

| 119,459 | Great Britain | Oct. 21, 1920 |
| 145,349 | Sweden | May 18, 1954 |